United States Patent
Klok et al.

(10) Patent No.: US 9,267,053 B2
(45) Date of Patent: Feb. 23, 2016

(54) PREPARATION AND USE OF BRANCHED POLYMERS CONTAINING HYDROXYL AND ACRYLATE GROUPS

(75) Inventors: Harm-Anton Klok, St. Sulpice (CH); Sanhao Ji, Chavannes (CH); Bernd Bruchmann, Freinsheim (DE)

(73) Assignee: BASF SE, Ludwigshafen (DE)

( * ) Notice: Subject to any disclaimer, the term of this patent is extended or adjusted under 35 U.S.C. 154(b) by 488 days.

(21) Appl. No.: 13/102,379

(22) Filed: May 6, 2011

(65) Prior Publication Data

US 2011/0275759 A1 Nov. 10, 2011

Related U.S. Application Data

(60) Provisional application No. 61/332,837, filed on May 10, 2010.

(51) Int. Cl.
C08G 16/02 (2006.01)
C09D 133/04 (2006.01)
C09D 161/00 (2006.01)

(52) U.S. Cl.
CPC ............. *C09D 133/04* (2013.01); *C08G 16/02* (2013.01); *C09D 161/00* (2013.01)

(58) Field of Classification Search
CPC ..... C08G 16/02; C09D 161/00; C09D 133/04
USPC ................... 524/592, 593, 597; 528/230, 245
See application file for complete search history.

(56) References Cited

U.S. PATENT DOCUMENTS

| 5,380,901 | A | 1/1995 | Antonucci et al. |
| 5,770,650 | A | 6/1998 | McGee et al. |
| 2006/0009589 | A1 | 1/2006 | Haering et al. |
| 2007/0135556 | A1 | 6/2007 | Schwalm et al. |
| 2009/0018300 | A1 | 1/2009 | Bloom et al. |

FOREIGN PATENT DOCUMENTS

| DE | 199 57 900 A1 | 6/2001 | |
| JP | 56117792 A * | 9/1981 | ............. C12N 11/08 |
| WO | WO 98/28252 A1 | 7/1998 | |
| WO | WO 2005/057286 A1 | 6/2005 | |
| WO | WO 2006/005491 A1 | 1/2006 | |
| WO | WO 2011/006947 A1 | 1/2011 | |

OTHER PUBLICATIONS

Padmesh Venkitasubramanian, et al., "New Polymer Systems from Baylis-Hillman Chemistry and Biorenewable Feedstocks", Polymer Preprints, 2008, 49 (1), pp. 914-915.
U.S. Appl. No. 13/382,197, filed Jan. 4, 2012, Klok, et al.

* cited by examiner

*Primary Examiner* — David W Wu
*Assistant Examiner* — Marie Reddick
(74) *Attorney, Agent, or Firm* — Oblon, McClelland, Maier & Neustadt, L.L.P.

(57) ABSTRACT

The present invention relates to branched polymers which contain hydroxyl groups and acrylate groups, to processes for preparing them, and to their use.

14 Claims, No Drawings

PREPARATION AND USE OF BRANCHED POLYMERS CONTAINING HYDROXYL AND ACRYLATE GROUPS

The present invention relates to branched polymers which contain hydroxyl groups and acrylate groups, to processes for preparing them, and to their use.

The branched polymers of the invention containing hydroxyl groups and acrylate groups can be prepared with preference via a reaction known as the Baylis-Hillman reaction, in which acrylates and carbonyl compounds, preferably aldehydes, are reacted with one another.

U.S. Pat. No. 5,380,901 describes the reaction of acrylates with para-formaldehyde to form ether-bridged diacrylates, and also the reaction of diacrylates with formaldehyde to form di($\alpha$-(1'-hydroxyalkyl)) acrylates, and also the potential use of such monomers in—for example—coatings. Bulk polymerization is described for curing.

WO 2005/57286 (corresponding to US 2007/135556) describes the reaction of acrylates with formaldehydes for the purpose of additional introduction of methylol groups into an existing molecule. Described in detail is the reaction of monofunctional acrylates with monofunctional carbonyl compounds, of polyfunctional acrylates with monofunctional carbonyl compounds, and monofunctional acrylates with polyfunctional carbonyl compounds. The aldehydes used as polyfunctional carbonyl compounds may comprise inter alia heteroatoms in the connecting alkylene chain.

P. Venkitasubramanian, E. C. Hagberg, and P. D. Bloom, Polymer Preprints 2008, 49 (1), 914 to 915, and US 2009/0018300 describe the preparation of bio-based polymers on the basis of a monomer which contains an aldehyde group and an acrylate group, from the reaction of 5-hydroxymethylfurfural and acryloyl chloride or methyl acrylate. This monomer is polymerized by means of the Baylis-Hillman reaction.

US 2009/0018300, in the merely "prophetic examples" 19 to 23, discloses the hypothetical preparation of linear polymers through a Baylis-Hillman reaction on the basis of diformylfuran and a furan-based and/or isosorbitol-based diacrylate. Since these hypothetical examples are prepared on the basis of renewable biological materials, the hypothetical products as well are likely to be biodegradable and hence of reduced stability. Moreover, the monomers of the "prophetic examples" are not available industrially, and their preparation is costly and inconvenient.

Branched polymers are not mentioned.

From the international application WO 2011/006947 it is known to prepare linear polymers containing hydroxyl groups and acrylate groups, by reacting dicarbonyl compounds and diacrylate compounds with one another.

Branched polymers are not mentioned.

It was an object of the invention, therefore, to develop new polymers containing hydroxyl groups and acrylate groups, which can be used either as such or as components for free-radically polymerizable, preferably radiation-curable systems, for systems curable by polyaddition or polycondensation, or for systems curable free-radically, preferably by radiation and via polyaddition or polycondensation, known as multi-cure, preferably dual-cure systems. The polymers ought to give rise to an expectation of improved stability relative to the linear polymers known in the prior art that are preparable through a Baylis-Hillman reaction.

This object is achieved by branched polymers (S) which contain hydroxyl groups and acrylate groups and are obtainable by reacting at least one carbonyl compound (A) selected from the group consisting of carbonyl compounds (Ax) having more than two carbonyl groups and,
dicarbonyl compounds (A2) having just two carbonyl groups, the carbonyl groups both in (A2) and in (Ax) being selected in each case independently of one another from the group consisting of
aldehyde groups and
keto groups and
at least one acrylate compound (B) selected from the group consisting of
acrylate compounds (By) having more than two acrylate groups and,
diacrylate compounds (B2),
with the proviso that the average functionality of the carbonyl-group-comprising compounds (A) and/or the average functionality of the acrylate-group-comprising compounds (B) is more than 2.

The average functionality of the compounds having the respective functional groups is defined as the sum of the molar fractions of each of the compounds, multiplied by their respective functionality.

Where, for example, a mixture is used of 0.6 mol of a diacrylate with 0.3 mol of a triacrylate and 0.1 mol of a tetraacrylate, the average functionality is $0.6 \times 2 + 0.3 \times 3 + 0.1 \times 4 = 2.5$.

The Baylis-Hillman reaction involves the condensation of an electron-poor alkene and an aldehyde, catalyzed, for example, by a tertiary amine or phosphine. The Baylis-Hillman adduct, an $\alpha$-methylene-$\beta$-hydroxy carbonyl derivative, is an interesting and important substructure which occurs frequently in natural and synthetic products of biological and medical interest. The typical Baylis-Hillman reaction uses unhindered nucleophilic tertiary amine catalysts as exemplified by 1,4-diazabicyclo[2.2.2]octane (DABCO).

Free-radically curable systems are polymerizable compositions which can be cured via free-radically initiated polymerization. Such initiation may be carried out, for example, via peroxides, azo compounds or oxygen.

Examples of thermally activable initiators are, for example, potassium peroxodisulfate, dibenzoyl peroxide, cyclohexanone peroxide, di-tert-butyl peroxide, cyclohexylsulfonyl acetyl peroxide, diisopropyl percarbonate, tert-butyl peroctoate or benzpinacol, di-tert-butyl peroxide, cumene hydroperoxide, dicumyl peroxide, tert-butyl perbenzoate, azobisisobutyronitrile, silylated pinacols, which are available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Radiation curing for the purposes of this specification is defined as the polymerization of polymerizable compounds as a consequence of electromagnetic and/or particulate radiation, preferably UV light in the wavelength ($\lambda$) range of 200 to 700 nm, but also IR or NIR radiation, and/or electron radiation in the range from 150 to 300 keV, and more preferably with a radiation dose of at least 80, preferably 80 to 3000 mJ/cm$^2$.

The term "dual-cure" or "multi-cure" refers for the purposes of this specification to a curing process which takes place via two or more than two mechanisms selected in particular, for example, from radiation, moisture, chemical, oxidative and/or thermal curing, preferably selected from radiation, moisture, chemical and/or thermal curing, more preferably selected from radiation, chemical and/or thermal curing, and very preferably radiation and chemical curing.

Polyaddition for the purposes of this specification is defined as the polymerization of polymerizable compounds without elimination of smaller molecules as a result of a reaction for example of hydroxyl groups (—OH), mercapto groups (—SH), carboxyl groups (—COOH) or amino groups (—NRH), preferably hydroxyl or carboxyl groups, more preferably hydroxyl groups, with groups that are reactive toward hydroxyl, mercapto, carboxyl or amino groups, examples being isocyanates, capped isocyanates, epoxides, cyclic carbonates or amino resins, preferably isocyanates, epoxides or amino resins, more preferably isocyanates or epoxides, and very preferably isocyanates.

It may also comprise the reaction of double bonds with compounds comprising groups that can be subjected to addition reaction with the double bonds, a named example being Michael addition. Primary or secondary amino groups in particular may be mentioned here.

Polycondensation for the purposes of this specification is defined as the polymerization of polymerizable compounds with elimination of smaller molecules as a result of a reaction for example of hydroxyl groups (—OH), mercapto groups (—SH) or amino groups (—NRH) with groups that are reactive toward hydroxyl, mercapto or amino groups, examples being carboxylic acids or derivatives thereof, sulfonic acids or derivatives thereof, carbonates, preferably carboxylic acids and derivatives thereof or carbonates, more preferably carboxylic acids, carbonyl halides, and carboxylic anhydrides.

For preparing the branched polymers (S) of the invention it is necessary to react with one another at least one more than difunctional carbonyl compound (Ax) and/or at least one more than difunctional acrylate compound (By).

Optionally it is possible additionally to react at least one difunctional carbonyl compound (A2) and/or at least one difunctional acrylate compound (B2).

The following reaction possibilities lead to the polymers (S) of the invention:
1) at least one compound (Ax) and at least one compound (By),
2) at least one compound (Ax) and at least one compound (B2),
3) at least one compound (A2) and at least one compound (By),
4) at least one compound (Ax) and at least one compound (By) and at least one compound (A2),
5) at least one compound (Ax) and at least one compound (By) and at least one compound (B2),
6) at least one compound (Ax) and at least one compound (B2) and at least one compound (A2),
7) at least one compound (By) and at least one compound (A2) and at least one compound (B2),
8) at least one compound (Ax) and at least one compound (By) and at least one compound (A2),
9) at least one compound (Ax) and at least one compound (By) and at least one compound (A2) and at least one compound (B2).

Among these, reaction possibilities 3) and 7) are preferred, with particular preference being given to reaction possibility 7), in which at least one compound (By) and at least one compound (A2) and at least one compound (B2) are reacted with one another.

The at least one carbonyl compound (Ax) having more than two carbonyl groups has on average more than two carbonyl groups, preferably at least 3, more preferably 3 to 6, very preferably 3 to 5, more particularly 3 to 4, and especially 3.

The compound or compounds in question may be at least one, one to four for example, preferably one to three, more preferably one to two, and very preferably just one compound (Ax).

The carbonyl groups therein are selected from the group consisting of
  aldehyde groups and
  keto groups,
the compounds in question, preferably, are either more than difunctional ketones or more than difunctional aldehydes, and more preferably are compounds containing exclusively aldehyde groups.

These functional groups may be connected to one another in any desired way, as for example through aromatic, aliphatic, cycloaliphatic or heteroaromatic groups or combinations thereof, preferably through aromatic or aliphatic groups.

Preferred compounds (Ax) are, for example, aromatics substituted by three aldehyde groups, such as 1,2,3-, 1,2,4- or 1,3,5-benzenetrialdehyde, 2,4,6-pyridinetrialdehyde, or hydroformylation products of alkane polyenes having a corresponding number of C═C double bonds, preferably alkanetrienes. The average number of aldehyde groups in the mixture can be controlled through the number of C═C double bonds and hydroformylation. Products of this kind are described for example in WO 98/28252, particularly from page 3 line 36 to page 11 line 44 therein, and also in examples 1 to 9 described therein.

A particularly preferred compound (Ax) is 1,3,5-benzenetrialdehyde.

Starting materials used for the reaction are, optionally, at least one, one to four for example, preferably one to three, more preferably one to two, and very preferably just one difunctional carbonyl compound (A2), with the above proviso.

The reactive groups of the dicarbonyl compound (A2) having just two carbonyl groups is selected from the group consisting of
  aldehyde groups (A2a) and
  keto groups (A2b).

Among the compounds (A2), diketones and dialdehydes are preferred, and more preferably the compound (A2) is a dialdehyde.

In the compound (A2) the two carbonyl groups are preferably connected to one another through an aliphatic, cycloaliphatic or aromatic hydrocarbon radical.

The dialdehydes as compounds (A2) are preferably compounds of the formula

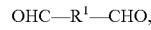

OHC—R$^1$—CHO, in which
R$^1$ is a divalent heteroaromatic or aliphatic, cycloaliphatic or aromatic hydrocarbon radical or a single bond.

R$^1$ is preferably unsubstituted or halogen-, C$_1$-C$_8$ alkyl-, C$_2$-C$_8$ alkenyl-, carboxyl-, carboxy-C$_1$-C$_8$ alkyl-, C$_1$-C$_{20}$ acyl-, C$_1$-C$_8$ alkoxy-, C$_6$-C$_{12}$ aryl-substituted C$_6$-C$_{12}$ arylene, C$_3$-C$_{12}$ cycloalkylene, C$_1$-C$_{20}$ alkylene or heteroarylene, or a single bond. Particular preference is given to unsubstituted C$_6$-C$_{12}$ arylene, C$_3$-C$_{12}$ cycloalkylene, C$_1$-C$_{20}$ alkylene or a single bond. Very particular preference is given to unsubstituted C$_6$-C$_{12}$ arylene, C$_2$-C$_{20}$ alkylene or a single bond.

C$_1$-C$_{20}$ alkylene herein is linear or branched alkylene, e.g., methylene, 1,2-ethylene, 1,2- or 1,3-propylene, 1,2-, 1,3- or 1,4-butylene, 1,1-dimethyl-1,2-ethylene, 1,2-dimethyl-1,2-ethylene, 1,5-pentylene, 1,6-hexylene, 1,8-octylene, 1,10-decylene or 1,20-eicosylene.

$C_3$-$C_{12}$ cycloalkylene is for example cyclopropylene, cyclopentylene, cyclohexylene, cyclooctylene or cyclododecylene.

$C_6$-$C_{12}$ arylene is for example phenylene, naphthylene or biphenylene.

Heteroarylene is, for example, a divalent radical formed by imaginary abstraction of two hydrogen atoms from a preferably five- or six-membered aromatic ring comprising at least one nitrogen atom, oxygen atom and/or sulfur atom, and selected more preferably from the group consisting of thiophene, furan, pyrrole, and pyridine.

Preferred radicals $R^1$ are a single bond, methylene, 1,2-ethylene, 1,3-propylene, 1,2-propylene, 1,4-butylene, 1,5-pentylene, 1,6-hexylene, 1,2-phenylene, 1,3-phenylene, 1,4-phenylene, 2,3-tolylene, 2,4-tolylene, 2,6-tolylene, 1,2-cyclohexylene, 1,3-cyclohexylene, and 1,4-cyclohexylene.

Particularly preferred radicals $R^1$ are a single bond, 1,2-ethylene, 1,3-propylene, 1,4-butylene, 1,3-phenylene, and 1,4-phenylene.

Preferred compounds (A2) are glyoxal, succinaldehyde, glutaraldehyde, caproaldehyde, furan-2,5-dialdehyde, pyrrole-2,5-dialdehyde, pyridine-2,6-dialdehyde, phthalaldehyde, isophthalaldehyde and terephthalaldehyde, particular preference being given to glyoxal, succinaldehyde, glutaraldehyde, isophthalaldehyde, and terephthalaldehyde.

The at least one acrylate compound (By) having more than two acrylate groups has on average more than two acrylate groups, preferably at least 3, more preferably 3 to 8, very preferably 3 to 6, more particularly 3 to 4, and especially 3.

The compound or compounds in question may be at least one, one to four for example, preferably one to three, more preferably one to two, and very preferably just one compound (By).

The acrylate compounds (By) may be, for example, acrylic esters of polyalcohols, such as polyols, polyetherols, polyesterols or polyacrylate-polyols, having the corresponding functionality. Accordingly, suitable compounds (By) may be polyether acrylates, polyester acrylates, acrylated polyacrylate-ols or urethane-acrylates having the desired functionality of greater than 2.

The acrylate compounds (By) are preferably acrylic esters of polyols having a functionality greater than 2, it being possible for the polyols, preferably, to be optionally alkoxylated alkane polyols.

Suitable alkylene oxides for such alkoxylation are, for example, ethylene oxide, propylene oxide, n-butylene oxide, isobutylene oxide, vinyloxirane and/or styrene oxide.

The alkylene oxide chain may be composed preferably of ethylene oxide, propylene oxide and/or butylene oxide units. A chain of this kind may be composed of one species of an alkylene oxide or of a mixture of alkylene oxides. Where a mixture is used it is possible for the different alkylene oxide units to be present randomly or as a block or blocks of individual species. Preference as alkylene oxide is given to ethylene oxide, propylene oxide or a mixture thereof, particular preference to either ethylene oxide or propylene oxide, and very particular preference to ethylene oxide.

The number of alkylene oxide units in the chain is, for example, 1 to 20, preferably 1 to 10, more preferably 1-5, and more particularly 1-3, and with a special preference 1, based on the respective hydroxyl groups of the polyalcohol.

Particular preference is given to optionally alkoxylated polyols of the formulae (IIa) to (IIc)

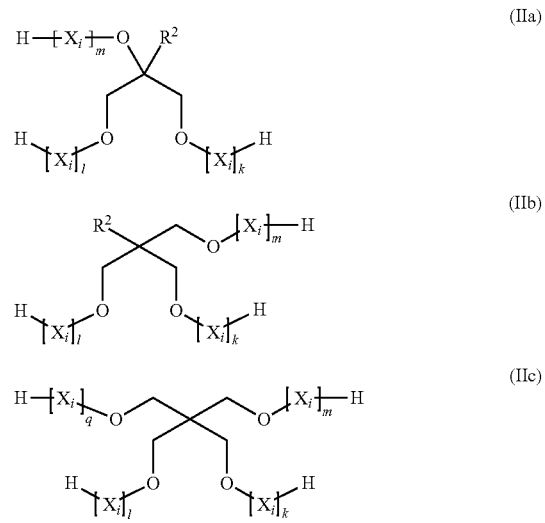

in which
$R^2$ is hydrogen or $C_1$-$C_{18}$-alkyl,
k, l, m, q independently of one another are each an integer from 0 to 10, preferably 0 to 5, more preferably 0 to 3, very preferably 0 to 2, more particularly 0 or 1, and especially 0, and
each $X_i$ for i=1 to k, 1 to l, 1 to m, and 1 to q may be selected, independently of the others, from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O— and —CHPh-$CH_2$—O—, preferably from the group —$CH_2$—$CH_2$—O—, —$CH_2$—$CH(CH_3)$—O— and —$CH(CH_3)$—$CH_2$—O—, and more preferably —$CH_2$—$CH_2$—O—,
in which Ph is phenyl and Vin is vinyl.

These compounds are preferably acrylates of singly to vigintuply and more preferably triply to decuply ethoxylated, propoxylated or mixedly ethoxylated and propoxylated and, in particular, exclusively ethoxylated or especially unalkoxylated glycerol, trimethylolpropane, trimethylolethane or pentaerythritol.

Compounds (By) which may additionally be conceived are di-trimethylolpropane tetraacrylate and di-pentaerythritol hexaacrylate or sorbitol-based acrylates.

Preferred compounds (By) are trimethylolpropane triacrylate, pentaerythritol tetraacrylate, glyceryl triacrylate, and triacrylate of singly to vigintuply ethoxylated trimethylolpropane, glycerol or pentaerythritol.

Particularly preferred compounds are trimethylolpropane triacrylate and pentaerythritol tetraacrylate.

As a further starting material it is possible optionally to use at least one, one to four for example, preferably one to three, more preferably one to two, and very preferably just one difunctional acrylate (B2).

The diacrylate compound (B2) comprises any desired difunctional acrylates, preferably diacrylates of alkanediols or cycloalkanediols and also lower polyalkylene glycols, preferably polyethylene glycols or polypropylene glycols, or—albeit less preferably—difunctional acrylamides of diamines, preferably of linear or branched aliphatic or cycloaliphatic diamines.

The compounds (B2) are preferably those having a molecular weight below 400 g/mol, and more preferably are structurally uniform compounds, i.e., those which have no molecular weight distribution.

The alkanediols may preferably be ethylene glycol, 2,2-dimethyl-1,2-ethanediol, 1,3-propanediol, 1,2-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, neopentyl glycol, 2-ethyl-1,3-propanediol or 2-methyl-1,3-propanediol.

The cycloalkanediols may preferably be 2,2-bis(4-hydroxycyclohexyl)propane, 1,1-, 1,2-, 1,3-, and 1,4-cyclohexanedimethanol, or 1,2-, 1,3- or 1,4-cyclohexanediol.

The polyalkylene glycols may preferably be polyethylene glycols, polypropylene glycols, polyTHF or poly-1,3-propanediol. Particular preference is given to polyethylene glycols or polypropylene glycols as mixtures of the isomers.

Among the polyalkylene glycols, dimers to pentamers are preferred.

The diamines are preferably linear or branched, aliphatic or cycloaliphatic, primary and/or secondary diamines, such as 1,2-diaminoethane, 1,2- or 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane or piperazine, for example.

Particularly preferred diacrylates (B2) are ethylene glycol diacrylate, 1,2-propanediol diacrylate, 1,3-propanediol diacrylate, 1,3-butanediol diacrylate, 1,4-butanediol diacrylate, 1,6-hexanediol diacrylate, diethylene glycol diacrylate, dipropylene glycol diacrylate, tripropylene glycol diacrylate, N,N'-bisacryloyl-1,2-diaminoethane, N,N'-bisacryloyl-1,6-diaminohexane or N,N'-bisacryloylpiperazine.

Especially preferred compounds are 1,6-hexanediol diacrylate and dipropylene glycol diacrylate.

The implementation of the Baylis-Hillman reaction is known per se to the skilled worker and is subject matter of a number of literature reviews.

The reaction may be implemented at a temperature between 0° C. and 100° C., preferably 20 to 80° C. and more preferably 25° C. to 60° C.

In order to bring ketones to reaction it may be necessary to apply high pressure.

A catalyst used for the reaction is usually a tertiary amine or phosphine, examples being trimethylamine, triethylamine, tri-n-butylamine, ethyldiisopropylamine, methyldiisopropylamine, N-methylmorpholine, N-methylpiperidine, triethanolamine, N,N-dimethylethanolamine, 4-dimethylaminopyridine, diazabicyclooctane, 1,5-diazabicyclo[4.3.0]non-5-ene (DBN), 1,8-diazabicyclo[5.4.0]undec-7-ene (DBU), pyrrocoline, quinuclidine, quinidine, trimethylphosphine, triethylphosphine, tri-n-butylphosphine, dimethylphenylphosphine, and, preferably, 1,4-diazabicyclo[2.2.2]octane (DABCO). The catalyst is used in general in amounts of 1 to 100 mol % with respect to acrylic groups, preferably 2-50, more preferably 3-40, and very preferably 5-30 mol %.

The stoichiometry between acrylate-group-comprising monomers, present in total in the compounds (Ax) and optionally (A2), and carbonyl-group-comprising monomers, present in total in the compounds (By) and optionally (B2), is on a molar basis generally 1:0.05-1.5, preferably 1:0.1-1.3, more preferably 1:0.2-1.0, and very preferably 1:0.4-1.0.

The molar ratio of more than difunctional compounds (Ax) and (By) in total to the total of the difunctional compounds (A2) and (B2) is generally of 1:0-5, preferably of 1:0.1 to 4, more preferably of 1:0.25 to 3, very preferably of 1:0.5 to 2, and more particularly 1:0.8-1.5.

The polymers obtainable in accordance with the invention are notable over the polymers obtainable from the prior art in that they are branched, whereas the processes from the prior art afford only linear polymers.

This means that a higher crosslinking density can be obtained and hence coatings obtained with the polymers of the invention exhibit higher hardness and/or scratch resistance.

The degree of branching (DB) of a polymer is calculated as disclosed in H. Frey et al., Acta Polym. 1997, 48, 30-35, see formula (I) therein.

According to formula (I) of Frey et al. the degree of branching is defined as $$DB[\%]=(D+T)/(D+L+T), \text{ multiplied by } 100$$

in which

D, T and L are respectively the proportions of branching, terminal or linearly incorporated monomer units in the polymer.

The polymers obtainable in accordance with the invention generally have a degree of branching of at least 5%, preferably of at least 10%, more preferably of at least 15%, very preferably at least 20%, and more particularly at least 25%.

The degree of branching can be determined, for example, by NMR analysis on the basis of model substances.

A polymer obtainable in accordance with the invention and having an ideally branched construction without linear components has a degree of branching of 100%; the polymers of the invention are preferably obtainable as branched or highly branched polymers having a degree of branching of up to 99.9%, more preferably up to 99%, very preferably up to 98%, and more particularly up to 95%.

Solvents which can be used for the Baylis-Hillman reaction are preferably water, petroleum ether, ligroin, toluene, benzene, xylene, tetrahydrofuran (THF), diethyl ether, dioxane, a methacrylate, or else the acrylate used for the reaction. The reaction can also be carried out in the absence of a solvent.

Where a methacrylate or the acrylate involved in the reaction (referred to below as (meth)acrylate) is used as solvent, the resultant reaction mixture, which comprises not only the (meth)acrylate used but also polymer of the invention, can be purified or used as it is without separation of the (meth) acrylate, in which case the (meth)acrylate then acts as a reactive diluent or polyfunctional (meth)acrylate (see below).

Purification of the reaction mixture may be omitted, and it will be appreciated that the mixture can of course also be purified by distillation, stripping, acidic, alkaline or neutral scrubbing, filtration, by treatment with ion exchangers or the like.

The polymers of the invention generally have a number-average molecular weight Mn of 312 to 20 000, preferably of 400 to 10 000, and more preferably of 500 to 5000 g/mol and a weight-average molecular weight Mw of 312 to 50 000, preferably of 400 to 30 000, and more preferably of 500 to 20 000. The molecular weights can be determined for oligomers by determination of the degree of polymerization and subsequent calculation of molecular weight from the individual weights of the monomers, or for polymers by gel permeation chromatography with a suitable polymer standard and tetrahydrofuran or dimethylformamide as eluent.

Generally speaking, the polymers of the invention change from colorless to an amber coloration, and dissolve well in solvents, such as methanol, ethanol, dimethylformamide, dimethylacetamide, ethyl acetate, butyl acetate, tetrahydrofuran, acetone, 2-butanone or toluene.

It is an advantage of the polymers (S) of the invention that they are more stable than the polymers suggested in the prior art on the basis of diformylfuran and a furan-based and/or isosorbitol-based diacrylate. Because the polymers of the invention have a hydrocarbon radical they are less susceptible than the aforementioned polymers to biodegradation, and hence more stable, and also, consequently, more resistant to water. Furthermore, their light fastness is improved over that of the electron-rich furan system, since in the case of the aromatic monomers they possess a less electron-rich construction or, in the case of the aliphatic and cycloaliphatic monomers (A2), they possess a construction which is stable toward irradiation of light.

A key advantage of the invention, furthermore, is the possibility of using a very wide variety of monomers (Ax, A2) and (By, B2). Through this variable synthesis it is possible to tailor molecular weight, polarity, reactivity, and compatibility of the polymers very precisely to the desired system properties of the end product.

Furthermore, the monomers (Ax, A2) and (By, B2) are available industrially and hence the polymers (S) are easy to produce.

In one preferred embodiment the carbonyl compounds are used substoichiometrically in relation to the compounds containing acrylate groups, hence giving reaction mixtures which comprise the Baylis-Hillman product in a mixture with the acrylate employed. Mixtures of this kind can be used with advantage in coating materials for radiation curing and/or dual-cure curing.

For use in radiation curing, the polymers (S) of the invention can be mixed with at least one photoinitiator (P). Typical quantities of 0.1% to 10% by weight of photoinitiator are sufficient, preferably 0.2% to 5% by weight.

As photoinitiators (P) it is possible to use the photoinitiators that are known to the skilled worker. Those contemplated include photoinitiators which are activable with UV light, as are described in WO 2006/005491 A1, page 21 line 18 to page 22 line 2 (corresponding to US 2006/0009589 A1, paragraph [0150]), which is hereby made part of the present disclosure by reference. It will be appreciated that it is also possible to use photoinitiators activable with IR radiation. These photoinitiators frequently comprise a combination of at least one sensitizer dye, more particularly cyanine, xanthylium or thiazine dyes, with at least one coinitiator, examples being boranate salts, sulfonium salts, iodonium salts, sulfones, peroxides, pyridine N-oxides or halomethyltriazines.

In one preferred embodiment, moreover, the polymers of the invention may be mixed with at least one reactive diluent and/or at least one polyfunctional, polymerizable compound and/or further typical coatings additives, to give radiation-curable coating materials.

Reactive diluents are, for example, esters of (meth)acrylic acid with alcohols having 1 to 20 carbon atoms, examples being methyl (meth)acrylate, ethyl (meth)acrylate, butyl (meth)acrylate, 2-ethylhexyl(meth)acrylate, 2-hydroxyethyl acrylate, 4-hydroxybutyl acrylate, dihydrodicyclopentadienyl acrylate, vinylaromatic compounds, e.g. styrene, divinylbenzene, α,β-unsaturated nitriles, e.g., acrylonitrile, methacrylonitrile, α,β-unsaturated aldehydes, e.g., acrolein, methacrolein, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, isobutene, cyclic monounsaturated compounds, e.g., cyclopentene, cyclohexene, cyclododecene, N-vinylformamide, allylacetic acid, vinylacetic acid, mono-ethylenically unsaturated carboxylic acids having 3 to 8 carbon atoms and their water-soluble alkali metal, alkaline earth metal or ammonium salts, such as, for example, acrylic acid, methacrylic acid, dimethylacrylic acid, ethacrylic acid, maleic acid, citraconic acid, methylenemalonic acid, crotonic acid, fumaric acid, mesaconic acid and itaconic acid, maleic acid, N-vinylpyrrolidone, N-vinyl lactams, such as N-vinylcaprolactam, N-vinyl N-alkylcarboxamides or N-vinylcarboxamides, such as N-vinylacetamide, N-vinyl-N-methylformamide and N-vinyl-N-methylacetamide, or vinyl ethers, e.g., methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, 4-hydroxybutyl vinyl ether and mixtures thereof.

(Meth)acrylic in this specification stands as a collective term for methacrylic and acrylic.

Polyfunctional polymerizable compounds are preferably polyfunctional (meth)acrylates which carry at least 2, preferably 3-10, more preferably 3-6, very preferably 3-4 and in particular 3 (meth)acrylate groups, preferably acrylate groups.

These may be, for example, esters of (meth)acrylic acid with polyalcohols having a corresponding hydricity of at least two.

Examples of polyalcohols of this kind are at least dihydric polyols, polyetherols or polyesterols or polyacrylate polyols having an average OH functionality of at least 2, preferably 3 to 10.

Examples of polyalcohols with a hydricity of at least two are for example alkoxylated polyalcohols with a hydricity of at least two of the formulae (IVa) to (IVc),

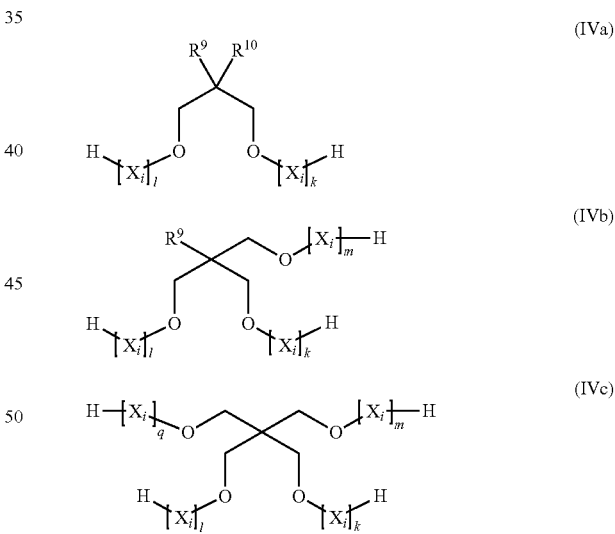

in which
$R^9$ and $R^{19}$ independently of one another are hydrogen or $C_1$-$C_{18}$ alkyl,
k, l, m, and q independently of one another are each an integer from 1 to 10, preferably from 1 to 5, and more preferably from 1 to 3, and
each $X_i$ for i=1 to k, 1 to l, 1 to m, and 1 to q can be selected, independently of the others, from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CHVin$-O—, —$CHVin$-$CH_2$—O—, —$CH_2$—

CHPh—O— and —CHPh-CH$_2$—O—, preferably from the group —CH$_2$—CH$_2$—O—, —CH$_2$—CH(CH$_3$)—O— and —CH(CH$_3$)—CH$_2$—O—, and more preferably —CH$_2$—CH$_2$—O—,
in which Ph is phenyl and Vin is vinyl.

These compounds are preferably acrylates of singly to vigintuply and more preferably triply to decuply ethoxylated, propoxylated or mixedly ethoxylated and propoxylated and, in particular, exclusively ethoxylated neopentyl glycol, glycerol, trimethylolpropane, trimethylolethane or pentaerythritol.

Preferred compounds (IV) are ethylene glycol diacrylate, 1,2-propanediol diacrylate, 1,3-propanediol diacrylate, 1,3-butanediol diacrylate, 1,4-butanediol diacrylate, 1,6-hexanediol diacrylate, trimethylolpropane triacrylate, pentaerythritol tetraacrylate, polyester polyol acrylates, polyetherol acrylates, and triacrylate of singly to vigintuply ethoxylated trimethylolpropane.

Particularly preferred compounds are 1,4-butanediol diacrylate, 1,6-hexanediol diacrylate, trimethylolpropane triacrylate, pentaerythritol tetraacrylate, and triacrylate of singly to vigintuply ethoxylated trimethylolpropane.

Examples of suitable alkylene oxides are ethylene oxide, propylene oxide, isobutylene oxide, vinyloxirane and/or styrene oxide.

The alkylene oxide chain may be composed preferably of ethylene oxide, propylene oxide and/or butylene oxide units. A chain of this kind may be composed of one species of an alkylene oxide or of a mixture of alkylene oxides. Where a mixture is used it is possible for the different alkylene oxide units to be present randomly or as a block or blocks of individual species. Preference as alkylene oxide is given to ethylene oxide, propylene oxide or a mixture thereof, particular preference to ethylene oxide or propylene oxide and very particular preference to ethylene oxide.

The number of alkylene oxide units in the chain is, for example, from 1 to 20, preferably from 1 to 10, more preferably 1-5 and in particular 1-3 and with especial preference 1, based on the respective hydroxyl groups of the polyalcohol.

Examples of suitable polyesterols include those already listed above.

The molecular weights M$_n$ of the polyesterols and/or polyetherols are preferably between 100 and 4000 g/mol (M$_n$ determined by gel permeation chromatography using polymethyl methacrylate as standard and tetrahydrofuran as eluent).

Further polyfunctional (meth)acrylates may be polyester (meth)acrylates, epoxy(meth)acrylates, urethane(meth)acrylates, or (meth)acrylated polyacrylates, as listed above as acrylates of (IVa), (IVb) or (IVc). Instead of the (meth)acrylate groups it is also possible to use other free-radically or cationically polymerizable groups.

Urethane(meth)acrylates are obtainable, for example, by reacting polyisocyanates with hydroxyalkyl(meth)acrylates or hydroxyalkyl vinyl ethers and optionally chain extenders such as diols, polyols, diamines, polyamines or dithiols or polythiols.

Preferred polyfunctional (meth)acrylates are trimethylolpropane tri(meth)acrylate, (meth)acrylates of ethoxylated and/or propoxylated trimethylolpropane, pentaerythritol, glycerol or ditrimethylolpropane. Particular preference is given to acrylates of ethoxylated and/or propoxylated trimethylolpropane or pentaerythritol.

As further, typical coatings additives it is possible for example to use antioxidants, stabilizers, activators (accelerators), fillers, pigments, dyes, antistats, flame retardants, thickeners, thixotropic agents, surface-active agents, viscosity modifiers, plasticizers or chelating agents.

As accelerators for the thermal aftercure it is possible to use, for example, tin octoate, zinc octoate, dibutyltin dilaurate or diazabicyclo[2.2.2]octane.

In addition it is possible to add one or more photochemically and/or thermally activable initiators, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those thermally activable initiators with a half-life at 80° C. of more than 100 hours, such as di-t-butyl peroxide, cumene hydroperoxide, dicumyl peroxide, t-butyl perbenzoate, silylated pinacols, such as those available commercially under the trade name ADDID 600 from Wacker, or hydroxyl-containing amine N-oxides, such as 2,2,6,6-tetramethylpiperidine N-oxyl, 4-hydroxy-2,2,6,6-tetramethylpiperidine N-oxyl, etc.

Other examples of suitable initiators are described in "Polymer Handbook", 2nd ed., Wiley & Sons, New York.

Suitable thickeners besides free-radically (co)polymerized (co)polymers include customary organic and inorganic thickeners such as hydroxymethylcellulose or bentonite.

As chelating agents it is possible for example to use ethylenediamine tetraacetic acid and its salts and also β-diketones.

Suitable fillers comprise silicates, e.g., silicates obtainable by hydrolysis of silicon tetrachloride, such as Aerosil® from Degussa, siliceous earth, talc, aluminum silicates, magnesium silicates, calcium carbonates, etc.

Suitable stabilizers comprise typical UV absorbers such as oxanilides, triazines and benzotriazole (the latter obtainable as Tinuvin® products from Ciba-Spezialitätenchemie) and benzophenones. These can be used alone or together with suitable free-radical scavengers, examples of which are sterically hindered amines such as 2,2,6,6-tetramethylpiperidine, 2,6-di-tert-butylpiperidine or derivatives thereof, e.g., bis(2,2,6,6-tetramethyl-4-piperidyl) sebacinate. Stabilizers are used normally in amounts of from 0.1 to 5.0% by weight, based on the solid components present in the formulation.

The polymers (S) of the invention can be used with advantage for dual-cure or multi-cure applications if they further comprise at least one compound (V) having at least one hydroxyl(—OH)-reactive group.

Compounds (V) having at least one hydroxyl(—OH)-reactive group may be, for example, isocyanates, capped isocyanates, epoxides, carboxylic acids or derivatives thereof, carbonates or amino resins, preference being given to isocyanates, blocked isocyanates, and melamine-formaldehyde resins, and particular preference to isocyanates.

Isocyanates are for example aliphatic, aromatic, and cycloaliphatic diisocyanates and polyisocyanates having an NCO functionality of at least 1.8, preferably from 1.8 to 5, and more preferably from 2 to 4, and also their isocyanurates, biurets, urethanes, allophanates, and uretdiones.

The diisocyanates are preferably isocyanates having 4 to 20 C atoms. Examples of common diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)-methane, 1-isocyanato-3,3,5-trimethyl-5-(isocyanatomethyl)cyclohexane (isophorone diisocyanate), 1,3- or 1,4-bis(isocyanatomethyl) cyclohexane or 2,4-, or 2,6-diisocyanato-1-methylcyclohexane and also 3 (or 4), 8 (or 9)-bis(isocyanatomethyl)-tricyclo

[5.2.1.0$^{2.6}$] decane isomer mixtures and also aromatic diisocyanates such as 2,4- or 2,6-tolylene diisocyanate and the isomer mixtures thereof, m- or p-xylylene diisocyanate, 2,4'- or 4,4'-diisocyanatodiphenylmethane (MDI) and the isomer mixtures thereof, mixtures of 2,4'-, 4,4'- and oligomeric diisocyanatodiphenylmethanes (polymer MDI), 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethyldiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Suitable polyisocyanates include polyisocyanates containing isocyanurate groups, uretdione diisocyanates, polyisocyanates containing biuret groups, polyisocyanates containing urethane or allophanate groups, polyisocyanates comprising oxadiazinetrione or iminooxadiazinedione groups, uretonimine-modified polyisocyanates of straight-chain or branched $C_4$-$C_{20}$ alkylene diisocyanates, cycloaliphatic diisocyanates having 6 to 20 C atoms in all or aromatic diisocyanates having 8 to 20 C atoms in all, or mixtures thereof.

The diisocyanates and polyisocyanates which can be used preferably have an isocyanate group content (calculated as NCO, molecular weight=42 g/mol) of 10 to 60% by weight, based on the diisocyanate and polyisocyanate (mixture), more preferably 12 to 50% by weight and very preferably 12 to 40% by weight.

Preference is given to aliphatic and/or cycloaliphatic diisocyanates and polyisocyanates, examples being the aliphatic and cycloaliphatic diisocyanates, respectively, that have been mentioned above, or to mixtures thereof.

Hexamethylene diisocyanate, 1,3-bis(isocyanatomethyl) cyclohexane, isophorone diisocyanate, and di(isocyanatocyclohexyl)methane or their polyisocyanates are particularly preferred, isophorone diisocyanate and hexamethylene diisocyanate or their polyisocyanates are very particularly preferred, and hexamethylene diisocyanate or its polyisocyanates are especially preferred.

Preference is extended to
1) Polyisocyanates containing isocyanurate groups and derived from aromatic, aliphatic and/or cycloaliphatic diisocyanates. Particularly preferred here are the corresponding aliphatic and/or cycloaliphatic isocyanato isocyanurates and in particular those based on hexamethylene diisocyanate and isophorone diisocyanate. The isocyanurates present are, in particular, trisisocyanatoalkyl or trisisocyanatocycloalkyl isocyanurates, which constitute cyclic trimers of the diisocyanates, or mixtures with their higher homologs containing more than one isocyanurate ring. The isocyanato isocyanurates generally have an NCO content of from 10 to 30% by weight, in particular 15 to 25% by weight, and an average NCO functionality of 2.6 to 4.5.
2) Uretdione diisocyanates having aromatically, aliphatically and/or cycloaliphatically attached isocyanate groups, preferably aliphatically and/or cycloaliphatically attached groups, and in particular those derived from hexamethylene diisocyanate or isophorone diisocyanate. Uretdione diisocyanates are cyclic dimerization products of diisocyanates.
In the formulations of the invention the uretdione diisocyanates can be used as a component alone or in a mixture with other polyisocyanates, particularly those specified under 1).
3) Polyisocyanates containing biuret groups and having aromatically, cycloaliphatically or aliphatically, preferably cycloaliphatically or aliphatically, attached isocyanate groups, especially tris(6-isocyanatohexyl)biuret or its mixtures with its higher homologs. These polyisocyanates containing biuret groups generally have an NCO content of from 18 to 22% by weight and an average NCO functionality of 2.8 to 4.5.
4) Polyisocyanates containing urethane and/or allophanate groups and aromatically, aliphatically or cycloaliphatically, preferably aliphatically or cycloaliphatically, attached isocyanate groups, as are obtainable for example by reacting excess amounts of hexamethylene diisocyanate or of isophorone diisocyanate with monohydric or polyhydric alcohols such as methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol or polyhydric alcohols as listed above for the polyesterols, or mixtures thereof. These polyisocyanates containing urethane and/or allophanate groups generally have an NCO content of from 12 to 20% by weight and an average NCO functionality of 2.5 to 4.5.
5) Polyisocyanates comprising oxadiazinetrione groups, preferably derived from hexamethylene diisocyanate or isophorone diisocyanate. Polyisocyanates of this kind comprising oxadiazinetrione groups can be prepared from diisocyanate and carbon dioxide.
6) Polyisocyanates comprising iminooxadiazinedione groups, preferably derived from hexamethylene diisocyanate or isophorone diisocyanate. Polyisocyanates of this kind comprising iminooxadiazinedione groups can be prepared from diisocyanates by means of specific catalysts.
7) Uretonimine-modified polyisocyanates.

Polyisocyanates 1) to 7) can be used in a mixture, including optionally a mixture with diisocyanates.

The isocyanate groups may also be in capped form. Examples of suitable capping agents for NCO groups include oximes, phenols, imidazoles, pyrazoles, pyrazolinones, diketopiperazines, caprolactams, malonic esters or compounds as specified in the publications by Z. W. Wicks, Prog. Org. Coat. 3 (1975) 73-99 and Prog. Org. Coat 9 (1981), 3-28 and also in Houben-Weyl, Methoden der Organischen Chemie, vol. XIV/2, 61 ff. Georg Thieme Verlag, Stuttgart 1963.

By blocking agents or capping agents in this context are meant compounds which convert isocyanate groups into blocked (capped or protected) isocyanate groups which subsequently, below the temperature known as the deblocking temperature, do not exhibit the usual reactions of a free isocyanate group. Compounds of this kind containing blocked isocyanate groups are commonly employed in dual-cure coating materials whose curing is completed via isocyanate group curing.

Epoxide compounds are those containing at least one, preferably containing at least two, preferably two or three, epoxide group(s) in the molecule.

Suitable examples include epoxidized olefins, glycidyl esters (e.g., glycidyl(meth)acrylate) of saturated or unsaturated carboxylic acids or glycidyl ethers of aliphatic or aromatic polyols. Products of this kind are offered commercially in large numbers. Particular preference is given to polyglycidyl compounds of the bisphenol A, F or B type and glycidyl ether of polyfunctional alcohols, e.g., of butanediol, of 1,6-hexanediol, of glycerol and of pentaerythritol. Examples of such polyepoxide compounds are Epikote® 812 (epoxide value: about 0.67 mol/100 g) and Epikote® 828 (epoxide value: about 0.53 mol/100 g), Epikote® 1001, Epikote® 1007 and Epikote® 162 (epoxide value: about 0.61 mol/100 g) from Resolution Performance Products, Rütapox® 0162 (epoxide value: about 0.58 mol/100 g), and Araldit® DY 0397 (epoxide value: about 0.83 mol/100 g) from Vantico AG.

Suitable components (V) further include compounds containing active methylol or alkylalkoxy groups, especially methylalkoxy groups, on amino resin crosslinkers, such as etherified reaction products of formaldehyde with amines, such as melamine, urea, etc., phenol/formaldehyde adducts, siloxane or silane groups and anhydrides, as described for example in U.S. Pat. No. 5,770,650.

Among the preferred amino resins, which are known and widespread industrially, it is possible with particular preference to use urea resins and melamine resins, such as urea-formaldehyde resins, melamine-formaldehyde resins, melamine-phenol-formaldehyde resins or melamine-urea-formaldehyde resins, for example.

Suitable urea resins are those which are obtainable by reacting ureas with aldehydes and which can optionally be modified.

Suitable ureas include urea and N-substituted or N,N'-disubstituted ureas, such as N-methylurea, N-phenylurea, N,N'-dimethylurea, hexamethylenediurea, N,N'-diphenylurea, 1,2-ethylenediurea, 1,3-propylenediurea, diethylenetriurea, dipropylenetriurea, 2-hydroxypropylenediurea, 2-imidazolidinone (ethyleneurea), 2-oxohexahydropyrimidine (propyleneurea) or 2-oxo-5-hydroxyhexahydropyrimidine (5-hydroxypropyleneurea).

Urea resins can optionally be partly or fully modified, for example by reaction with monofunctional or polyfunctional alcohols, ammonia and/or amines (cationically modified urea resins) or with (hydrogen)sulfites (anionically modified urea resins), particular suitability being possessed by the alcohol-modified urea resins.

Suitable alcohols for the modification include $C_1$-$C_6$ alcohols, preferably $C_1$-$C_4$ alcohol and in particular methanol, ethanol, isopropanol, n-propanol, n-butanol, isobutanol and sec-butanol.

Suitable melamine resins are those which are obtainable by reacting melamine with aldehydes and which may optionally be partly or fully modified.

Particularly suitable aldehydes include formaldehyde, acetaldehyde, isobutyraldehyde and glyoxal.

Melamine-formaldehyde resins are reaction products from the reaction of melamine with aldehydes, examples being the aforementioned aldehydes, especially formaldehyde. Optionally, the resultant methylol groups are modified by etherification with the abovementioned monohydric or polyhydric alcohols. It is also possible for the melamine-formaldehyde resins to be modified as described above by reaction with amines, amino carboxylic acids or sulfites.

The action of formaldehyde on mixtures of melamine and urea or on mixtures of melamine and phenol produces melamine-urea-formaldehyde resins or, respectively, melamine-phenol-formaldehyde resins which can likewise be used in accordance with the invention.

The amino resins referred to are prepared by methods known per se.

Examples mentioned particularly are melamine-formaldehyde resins, including monomeric or polymeric melamine resins and partly or fully alkylated melamine resins, urea resins, e.g., methylolureas such as formaldehyde-urea resins, alkoxyureas such as butylated formaldehyde-urea resins, but also N-methylolacrylamide emulsions, isobutoxymethylacrylamide emulsions, polyanhydrides, such as polysuccinic anhydride, and siloxanes or silanes, e.g., dimethyldimethoxysilanes.

Particular preference is given to amino resins such as melamine-formaldehyde resins or formaldehyde-urea resins.

Likewise disclosed is a method of coating substrates using a coating material of the invention.

The coating of the substrates is in accordance with customary methods which are known to the skilled worker, in which at least one coating material of the invention or coating formulation comprising it is applied to the target substrate in the desired thickness and the volatile constituents of the coating material are removed, optionally with heating. This operation can be repeated one or more times if desired. Application to the substrate may take place in a known way, for example, by spraying, troweling, knifecoating, brushing, rolling, roller coating or pouring. The coating thickness is generally in a range from about 3 to 1000 $g/m^2$ and preferably 10 to 200 $g/m^2$.

Disclosed in addition is a method of coating substrates which involves optionally adding further typical coatings additives and thermally curable resins to the coating materials of the invention or to coating formulations comprising them, applying the resultant systems to the substrate, and optionally drying them, and curing them with electron beams or by UV exposure under an oxygen-containing atmosphere or preferably under inert gas, optionally at temperatures up to the level of the drying temperature, and subsequently subjecting them to thermal treatment at temperatures up to 160° C., preferably between 60 and 160° C.

The method of coating substrates can also be conducted such that application of the inventive coating material or coating formulations is followed first by their thermal treatment at temperatures up to 160° C., preferably between 60 and 160° C., and subsequently by curing with electron beams or by UV exposure under oxygen or preferably under inert gas.

Curing of the films formed on the substrate can if desired take place by means of heat alone. Generally speaking and preferably, however, the coatings are cured both by exposure to high-energy radiation and thermally.

If two or more coats of the coating material are applied one above another it is optionally possible for each coating operation to be followed by a thermal and/or radiation cure.

Examples of suitable radiation sources for the radiation cure include low pressure mercury lamps, medium pressure mercury lamps, and high pressure mercury lamps, and also fluorescent tubes, pulsed lamps, metal halide lamps, electronic flash devices, which allow radiation curing without a photoinitiator, or excimer emitters. The radiation cure is effected by exposure to high-energy radiation, i.e., UV radiation or daylight, preferably light in the wavelength ($\lambda$) range of 200 to 700 nm, more preferably 200 to 500 nm, and very preferably 250 to 400 nm, or by irradiation with high-energy electrons (electron beams; 150 to 300 keV). Radiation sources used are for example high pressure mercury vapor lamps, lasers, pulsed lamps (flashlight), halogen lamps or excimer emitters. The radiation dose normally sufficient for crosslinking in the case of UV curing is in the range from 80 to 3000 $mJ/cm^2$.

It is of course also possible to use two or more radiation sources for curing, e.g., two to four.

The sources may also each emit in different wavelength ranges.

In addition to or instead of the thermal cure, curing may also be effected by means of NIR radiation, which here means electromagnetic radiation in the wavelength range from 760 nm to 2.5 µm, preferably from 900 to 1500 nm. Curing by radiation typically requires a suitable photoinitiator with an absorption in the region of the irradiated wavelength.

Optionally, irradiation can also be carried out in the absence of oxygen, e.g., under an inert gas atmosphere. Suitable inert gases include preferably nitrogen, noble gases, carbon dioxide, or combustion gases. Irradiation may also be performed with the coating material covered with transparent media. Examples of transparent media are polymer films, glass or liquids, e.g., water. Particular preference is given to irradiation in the manner described in DE-A1 199 57 900.

The invention further provides a method of coating substrates which comprises
i) coating a substrate with a coating material as described above,
ii) removing volatile constituents of the coating material in order to form a film, under conditions in which the initiator (P) as yet essentially forms no free radicals,
iii) optionally subjecting the film formed in step ii) to high-energy radiation, in the course of which the film is precured, and subsequently optionally machining the article coated with the precured film or contacting the surface of the precured film with another substrate, and,
iv) subjecting the film to a final thermal cure.

Steps iv) and iii) may also be carried out in the opposite order, i.e., the film can be cured first thermally and then with high-energy radiation.

The coating materials and formulations of the invention are particularly suitable for the coating of substrates such as wood, paper, textile, leather, nonwoven, plastics surfaces, glass, ceramic, mineral building materials, such as cement blocks and fiber cement slabs, or coated or uncoated metals, preferably for the coating of plastics or metals, possibly in the form of films or foils, for example.

With particular preference the coating materials of the invention are suitable as or in exterior coatings, i.e., in those applications where they are exposed to daylight, preferably on buildings or parts of buildings, interior coatings, traffic markings, coatings on vehicles and aircraft. The coating materials of the invention are employed in particular as or in automotive clearcoat and topcoat material(s).

The invention further provides for the use of the polymers (S) of the invention in coating materials for dual-core applications.

The invention further provides for the use of the polymers (S) of the invention in radiation curing.

The examples which follow are intended to illustrate the properties of the invention, though without imposing and restriction thereon.

All of the reactants and solvents were used in the commercially available purities as obtained. Reactants were used from Sigma Aldrich (Buchs, Switzerland), unless stated otherwise. Deuterated solvents for NMR were acquired from Armar Chemicals (Döttigen, Switzerland).

Gel permeation chromatography (GPC) was carried out using a Waters Alliance GPCV 2000 System with refractive index, differential viscometer, and light scattering detector. Separation was performed at 60° C. on TSK-Gel Alpha 2500+ 3000+4000 columns using vacuum-distilled dimethylformamide (HPLC purity) with 0.5 g/l LiCl as eluent or with anhydrous THF, at a flow rate of 0.6 ml/min. Molecular weights were determined using a universal calibration curve plotted using a poly(methyl methacrylate) (PMMA) standard with a low polydispersity. The results were calculated using the Empower Pro multidetection GPC software (Version 5.00). The volume within the detector was adjusted on the basis of the position of the signals of uniform PEG oligomers. The volume of the injector loop was 0.214 ml, and the polymer concentration was calculated such that the viscometric signal was less than 0.5% of the baseline.

NMR spectra: Bruker ARX-400 spectrometer at 400 MHz. $CDCl_3$ was used as the solvent. For $^1H$ NMR spectra: the chemical shift was specified relative to the residue signal of the solvent as an internal standard ($CDCl_3$: 7.25 ppm). $^1H$ assignments were confirmed by means of 2D-COSY-45 spectra. Coupling constants J in Hz.

Glass transition temperatures were determined using a Setaram DSC 131 differential scanning calorimeter on 3-5 mg sample quantities, with the heating rate at 5° C. per min and with measurement under N2.

EXAMPLE 1

Polymer of trimethylolpropane triacrylate and 2,6-pyridinedicarbaldehyde

A stirred mixture of trimethylolpropane triacrylate (175 µL, 0.584 mmol) and 2,6-pyridinedicarbaldehyde (118.5 mg, 0.876 mmol) was admixed with diazabicyclooctane (DABCO) (145 mg) and methanol (100 µL). 0.2 ml of DMF was also added as a solubilizer. The homogeneous reaction mixture was stirred at room temperature (23° C.) and the progress of the reaction was monitored by $^1H$ NMR and GPC. After 5 h the reaction mixture was diluted with chloroform and washed first with saturated $NaHCO_3$ solution and thereafter with saturated sodium chloride solution. After the chloroform phase had been dried over $Na_2SO_4$, the solvent was removed under reduced pressure and the end product was obtained in the form of a colorless oil.

The product of the invention had the following characteristic data:
GPC (DMF): Mn: 4600 Da, Mw: 36700 Da,
$^1H$ NMR (400 MHz, $CDCl_3$): 10.03 (CHO), 7.65 (pyridine-H), 7.3 (pyridine-H), 6.28 (=$CH_2$), 2.59 (=$CH_2$), 5.48 (—CH—OH), 4.8 (—OH), 3.92 (—O—$CH_2$—), 2.26 (—$CH_2$—$CH_3$), 0.79 (—CH—$CH_3$)

EXAMPLE 2

Polymer of 1,3-butanediol diacrylate and 1,3,5-benzenetricarbaldehyde

A stirred mixture of 1,3,5-benzenetricarbaldehyde (61.6 mg, 0.38 mmol) and 1,3-butanediol diacrylate (177.12 µl, 0.38 mmol) was admixed with quinuclidine (130 mg) and methanol (60 µl). Then 2 ml of DMF were added as a solubilizer. The homogeneous reaction mixture was stirred at room temperature (23° C.) and the progress of the reaction was monitored by $^1H$ NMR and GPC. After 24 h the reaction mixture was diluted with chloroform and washed first with saturated $NaHCO_3$ solution and thereafter with saturated sodium chloride solution. After the chloroform phase had been dried over $Na_2SO_4$, the solvent was removed under reduced pressure and the end product was obtained.

The product of the invention had the following characteristic data:
GPC (DMF): Mn: 3500 Da, Mw: 6400 Da,
$^1H$ NMR (400 MHz, DMSO-d6): 9.94 (CHO), 8.31 (CH in phenyl), 8.11 (CH in phenyl), 7.68 (CH in phenyl), 7.55 (CH in phenyl), 7.08 (CH in phenyl), 6.21 (=$CH_2$), 5.92 (=$CH_2$), 5.47 (—CH—OH), 4.87 (—CH—$CH_3$), 4.77 (—OH), 3.99 (—O—$CH_2$—$CH_2$—), 1.81 (—O—$CH_2$—$CH_2$—), 1.22 (—CH—$CH_3$)

EXAMPLE 3

Polymer of trimethylolpropane triacrylate and terephthalaldehyde

A 250 ml four-neck flask equipped with stirrer, reflux condenser, internal thermometer, and dropping funnel is charged with 13.4 g of terephthalaldehyde, 38.5 g of trimethylolpropane triacrylate (Laromer® TMPTA, BASF SE) and 2.9 g of diazabicyclooctane (DABCO), and this initial charge is heated with stirring to 80° C. After 3 h of stirring at 80° C., the reaction mixture becomes increasingly more viscous. Then 55 g of 2-butanone are added and stirring continues until a homogeneous solution is formed.

The solution is subsequently transferred to a 250 ml conical flask and cooled to room temperature, and 13.8 g of Amberlite® IR-120 (acidic ion exchanger) are added. The mixture is then stirred using a magnetic stirrer for 20 min. Subsequent checking of the pH after mixing of a small part of the solution with water gave a value of 6. Then the ion exchanger was separated from the remainder of the solution on a fluted filter and washed with 10 ml of 2-butanone, and the collected filtrates were freed from the solvent on a rotary evaporator at 60° C. under a pressure of 8 mbar. This gave a honey-colored polymer having the following characteristic data:

| GPC (THF) | Mn: 660 Da | Mw: 1030 Da |
|---|---|---|

EXAMPLE 4

Polymer of trimethylolpropane triacrylate and terephthalaldehyde

A 2 l four-neck flask equipped with stirrer, reflux condenser, internal thermometer, and dropping funnel is charged with 241.4 g of terephthalaldehyde, 639.4 g of trimethylolpropane triacrylate (Laromer® TMPTA, BASF SE) and 52.6 g of diazabicyclooctane (DABCO), and this initial charge is heated with stirring to 80° C. After 5 h of stirring at 80° C., the reaction mixture becomes increasingly more viscous. Then 800 g of 2-butanone are added and stirring continues until a homogeneous solution is formed.

The solution is subsequently transferred to a 5 l conical flask, cooled to room temperature, and diluted with a further 140 g of 2-butanone, and, with stirring using a magnetic stirrer, 260 g of Amberlite® IR-120 (acidic ion exchanger) are added in portions. The mixture is then stirred for a further 20 min. Subsequent checking of the pH after mixing of a small part of the solution with water gave a value of 5. The ion exchanger was then separated from the remainder of the solution via a fluted filter, and the filtrate was freed from the solvent on a rotary evaporator at 60° C. under a pressure of 8 mbar. This gave a honey-colored polymer having the following characteristic data:

| GPC (THF) | Mn: 780 Da | Mw: 1900 Da |
|---|---|---|
| Tg = −3.5° C. | | |

The invention claimed is:

1. A branched polymer (S), obtained by a process comprising reacting a carbonyl compound (A) and an acrylate compound (B), wherein said branched polymer (S) comprises a hydroxyl group and an acrylate group, and wherein the carbonyl compound (A) is at least one carbonyl compound selected from the group consisting of a carbonyl compound (Ax) having more than two carbonyl groups and a dicarbonyl compound (A2) having just two carbonyl groups, the more than two carbonyl groups of the carbonyl compound (Ax) and the just two carbonyl groups of the dicarbonyl compound (A2) are selected independently from the group consisting of an aldehyde group and a keto group, and wherein the acrylate compound (B) is at least one acrylate compound selected from the group consisting of an acrylate compound (By) having more than two acrylate groups and a diacrylate compound (B2), in which an average functionality of the carbonyl compound (A), the acrylate compound (B), or a combination thereof, is more than 2.

2. The polymer according to claim 1, wherein said acrylate compound (By) is present and is reacted in the presence of the dicarbonyl compound (A2).

3. The polymer according to claim 1, wherein said acrylate compound (By) and said diacrylate compound (B2) are present and are reacted in the presence of the dicarbonyl compound (A2).

4. The polymer according to claim 1, wherein the carbonyl compound (Ax) and the dicarbonyl compound (A2) are present and each comprise exclusively aldehyde groups.

5. The polymer according to claim 1, wherein said carbonyl compound (Ax) is present and which is at least one carbonyl compound selected from the group consisting of 1,2,3-benzenetrialdehyde, 1,2,4-benzenetrialdehyde, 1,3,5-benzenetrialdehyde and 2,4,6-pyridinetrialdehyde.

6. The polymer according to claim 1, wherein said dicarbonyl compound (A2) is present and is at least one carbonyl compound selected from the group consisting of glyoxal, succinaldehyde, glutaraldehyde, caproaldehyde, furan-2,5-dialdehyde, pyrrole-2,5-dialdehyde, pyridin-2,6-dialdehyde, phthalaldehyde, isophthalaldehyde and terephthalaldehyde.

7. The polymer according to claim 1, wherein said to acrylate compound (By) is present and which is at least one acrylate compound selected from the group consisting of a polyether acrylate, a polyester acrylate, an acrylated polyacrylateol, a urethane acrylate and an acrylic ester of an optionally alkoxylated polyol.

8. The polymer according to claim 1, wherein said acrylate compound (By) is present and which is an acrylic ester of an optionally alkoxylated polyol of formulae (IIa) to (IIc):

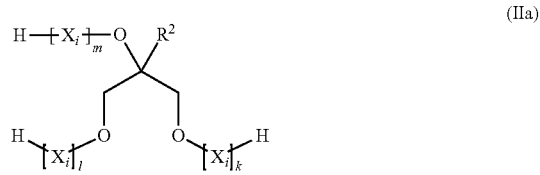

(IIa)

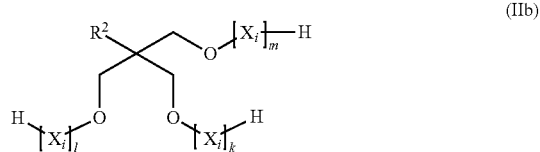

(IIb)

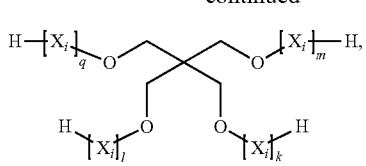
(IIc)

wherein

R² is a hydrogen group or a $C_1$-$C_{18}$-alkyl group, k, l, m, and q are each independently an integer of from 0 to 10, and each $X_i$ for i=1 to k, 1 to l, 1 to m, and 1 to q is optionally and independently selected from the group consisting of —$CH_2$—$CH_2$—O—, —$CH_2$—CH($CH_3$)—O—, —CH($CH_3$)—$CH_2$—O—, —$CH_2$—C($CH_3$)$_2$—O—, —C($CH_3$)$_2$—$CH_2$—O—, —$CH_2$—CHVin-O—, —CHVin-$CH_2$—O—, —$CH_2$—CHPh-O— and —CHPh-$CH_2$—O—, in which Ph is a phenyl group and Vin is a vinyl group.

9. The polymer according to claim 1, wherein said acrylate compound (By) is present and is at least one acrylate compound selected from the group consisting of trimethylolpropane triacrylate, pentaerythritol tetraacrylate, glyceryl triacrylate, a triacrylate of singly to vigintuply ethoxylated trimethylolpropane and a triacrylate of singly to vigintuply ethoxylated glycerol.

10. A process for producing a polymer according to claim 1, the process comprising:
reacting the carbonyl compound (A)
and the acrylate compound (B) at a temperature between 0° C. and 100° C., in the presence of a tertiary amine or phosphine, in a stoichiometry between the acrylate compound and the carbonyl compound of from 1:0.05 to 1:1.5, optionally in the presence of a solvent.

11. A coating material for a multi-cure application, the coating material comprising:
the polymer according to claim 1.

12. The polymer according to claim 1, wherein said process comprises reacting said carbonyl compound (A) and said acrylate compound (B) in the presence of a Baylis-Hillman reaction catalyst.

13. The polymer according to claim 12, wherein said Baylis-Hillman reaction catalyst is at least one catalyst selected from the group consisting of a tertiary amine and a phosphine.

14. The polymer according to claim 1, wherein said process comprising reacting a carbonyl compound (A) and an acrylate compound (B) is a Baylis-Hillman reaction.

* * * * *